(12) United States Patent
Wood

(10) Patent No.: US 9,742,734 B2
(45) Date of Patent: *Aug. 22, 2017

(54) FIREWALL SECURITY FOR COMPUTERS WITH INTERNET ACCESS AND METHOD

(71) Applicant: Michael C. Wood, Lazy Lake, FL (US)

(72) Inventor: Michael C. Wood, Lazy Lake, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/178,123

(22) Filed: Jun. 9, 2016

(65) Prior Publication Data

US 2016/0330171 A1 Nov. 10, 2016

Related U.S. Application Data

(63) Continuation of application No. 14/706,459, filed on May 7, 2015, now Pat. No. 9,467,324.

(60) Provisional application No. 61/991,828, filed on May 12, 2014.

(51) Int. Cl.
*H04L 29/06* (2006.01)
*H04L 29/12* (2006.01)

(52) U.S. Cl.
CPC .......... *H04L 63/0236* (2013.01); *H04L 29/06* (2013.01); *H04L 61/1511* (2013.01); *H04L 63/0209* (2013.01); *H04L 63/0227* (2013.01); *H04L 63/10* (2013.01); *H04L 63/1408* (2013.01)

(58) Field of Classification Search
CPC ............. H04L 63/0236; H04L 63/0209; H04L 63/1408; H04L 63/10; H04L 63/0227; H04L 61/1511; H04L 29/06
See application file for complete search history.

(56) References Cited

U.S. PATENT DOCUMENTS

| | | |
|---|---|---|
| 6,442,588 B1 | 8/2002 | Clark et al. |
| 7,451,234 B1 | 11/2008 | Bonner |
| 7,606,854 B2 | 10/2009 | Ellis, III |
| 7,792,994 B1 | 9/2010 | Hernacki |
| 7,805,756 B2 | 9/2010 | Ellis |

(Continued)

OTHER PUBLICATIONS

Sean, Wilkins, "Advanced ACL Configuration", Apr. 18, 2011, http://www.pearsonitcertification.com/articles/article.aspx?p=1701057.*

(Continued)

*Primary Examiner* — Chau Le
*Assistant Examiner* — Muhammad Chaudhry
(74) *Attorney, Agent, or Firm* — Johnson & Martin, P.A.; James David Johnson

(57) ABSTRACT

A firewall security platform is provided for enhancing security of a network. The firewall security platform includes at least one interface to communicate the identity and current status of one or more traffic requesters and at least one device for receiving instructions from a user. Communication data packets associated with the one or more traffic requesters are allowed for communication via the network or denied and blocked by the firewall security platform based on the current status of each of the one or more traffic requesters. The user's instructions include making a selection, with the selection including members that are at least one of the one or more traffic requesters. The current status of each member of the selection is altered in response to the making of the selection.

14 Claims, 13 Drawing Sheets

(56) References Cited

U.S. PATENT DOCUMENTS

| | | | |
|---|---|---|---|
| 8,347,394 B1* | 1/2013 | Lee | H04L 61/1511 726/22 |
| 8,819,227 B1* | 8/2014 | Keralapura | H04L 45/38 709/203 |
| 2003/0163567 A1* | 8/2003 | McMorris | H04L 29/06 709/225 |
| 2007/0016945 A1 | 1/2007 | Bassett et al. | |
| 2007/0033645 A1 | 2/2007 | Jones | |
| 2008/0109892 A1* | 5/2008 | Berthaud | H04L 29/06 726/15 |
| 2012/0023593 A1 | 1/2012 | Puder et al. | |
| 2012/0084423 A1* | 4/2012 | McGleenon | H04L 61/1511 709/223 |
| 2013/0262697 A1* | 10/2013 | Karasaridis | H04L 67/2847 709/242 |
| 2014/0019601 A1* | 1/2014 | Blacka | G06F 17/30887 709/223 |
| 2014/0173111 A1* | 6/2014 | Varner | H04L 63/101 709/225 |
| 2015/0033332 A1* | 1/2015 | Merza | H04L 63/1441 726/22 |
| 2016/0226819 A1* | 8/2016 | Manadhata | H04L 61/1511 |

OTHER PUBLICATIONS

Cook, Duncan, et al. "Catching spam before it arrives: domain specific dynamic blacklists." Proceedings of the 2006 Australasian workshops on Grid computing and e-research-vol. 54. Australian Computer Society, Inc., 2006.*

Chen, Juan, and Chuanxiong Guo. "Online detection and prevention of phishing attacks." 2006 First International Conference on Communications and Networking in China. IEEE, 2006.*

Antonakakis, Manos, et al. "Building a Dynamic Reputation System for DNS." USENIX security symposium. 2010.*

Antonakakis, Manos, et al. "Building a Dynamic Reputation System for DNS.", Retrieved from http://static.usenix.org/event/sec10/tech/full_papers/Antonakakis.pdf , USENIX security symposium. 2010.*

Zheng, Changxi, et al. "A light-weight distributed scheme for detecting IP prefix hijacks in real-time.", Retrieved from http://dl.acm.org/citation.cfm?id=1282412 , ACM SIGCOMM Computer Communication Review. vol. 37. No. 4. ACM, 2007.*

Ariyapperuma, S., et al., "Security Vulnerabilities in DNS and DNSSEC," downloaded from the Internet on Nov. 28, 2016 at <<web.mit.edu/6.033/www/papers/dnssec.pdf>>.

* cited by examiner www.apple.com
images.apple.com
metrics.apple.com

Fig. 9

* * 3 www.apple.com
images.apple.com
metrics.apple.com

Fig. 10 www.apple.com
images.apple.com
\*\*\*metrics.apple.com
\*\*\*www.mail.com
\*\*\*i0.mail.com
cdn.optimizely.com
s.uicdn.com
\*\*\*www. bankrate.com
as.ebz.io
\*\*\*i2.mail.com
8163535.log.optimizely.com
www.googletagservices.com
partner. googleleadservices.com
tags.bluekai.com
us.wa.ui-portal.com
\*\*\* b.scorecardresearch.com
a.triggit.com
d.ptd.com
ww1.5 collserve.com
t.mookie1.com
d.turn.com

*Fig. 11* www.apple.com
images.apple.com
-->metrics.apple.com
www.mail.com
i0.mail.com
cdn.optimizely.com
s.uicdn.com
www. bankrate.com
as.ebz.io
i2.mail.com
8163535.log.optimizely.com
www.googletagservices.com
partner. googleleadservices.com
tags.bluekai.com
us.wa.ui-portal.com
b.scorecardresearch.com
a.triggit.com
d.ptd.com
ww1.5 collserve.com
t.mookie1.com
d.turn.com

*Fig. 12* www.apple.com
images.apple.com
-->metrics.apple.com www.mail.com
i0.mail.com
cdn.optimizely.com [2]
s.uicdn.com
www. bankrate.com
as.ebz.io
i2.mail.com
8163535.log.optimizely.com
www.googletagservices.com
partner. googleleadservices.com
tags.bluekai.com [2]
us.wa.ui-portal.com
b.scorecardresearch.com
a.triggit.com
d.ptd.com
ww1.5 collserve.com
t.mookie1.com
d.turn.com

*Fig. 13*

FIREWALL SECURITY FOR COMPUTERS WITH INTERNET ACCESS AND METHOD

CROSS-REFERENCE TO RELATED APPLICATIONS

This application is a nonprovisional continuation application of and claims priority to U.S. nonprovisional patent application Ser. No. 14/706,459 filed on May 7, 2015, which claimed priority to U.S. provisional patent application Ser. No. 61/991,828 filed on May 12, 2014. The foregoing applications are incorporated in their entirety herein by reference.

FIELD OF THE INVENTION

The present invention relates to systems and methods for network security, and, more specifically, to firewalls and systems for providing online security.

BACKGROUND

Web browsers are the most-used internet application. Yet, no known firewall to date has been able to solve the issue of protecting web browser traffic. This deficiency has left a gaping hole in the protection of personal computers from hackers and other cybersecurity threats.

Web browser traffic is unique in that a single application (i.e., the web browser) often communicates with a multitude of different sites—often with a user dynamically selecting new and unique sites on a routine basis. This behavior has provided a unique challenge to firewall security; a challenge that had not been solved by existing technology.

For example, traditional firewalls allow users to define which applications may or may not access the network. However, when it comes to a web browser, the moment this single application is allowed access, a limitless number of sites are then allowed to be contacted via this one application. Hackers typically simply piggyback on the allowed web browser traffic, providing them unfettered access to and control of the user's PC.

In fact, the moment any application is allowed access to the network, the entire PC generally becomes vulnerable to cyberattack. Trojans are computer programs which allow a hacker to take total and complete control over a user's computer. Well-written trojans attach themselves to any application that has network access. In doing so, the trojans then have unfettered, firewall-approved access to the internet; thereby, the trojans have unfettered, firewall-approved access to the user's computer as well.

The use of "whitelists" and "blacklists" has been the traditional attempt at limiting the impact of this real-world cyberthreat. However, hackers have responded by continually changing their IP Addresses and Domain Names, rendering "blacklists" obsolete. "Whitelists" are very useful for most internet applications—with the notable exception of web browsers. Many web browser users do not want to be confined to a previously approved list of sites. The restrictive nature of whitelists and the act of browsing are antagonistic with one another.

Whitelists and blacklists are traditionally applied to IP Addresses, ports, and applications. One whitelist/blacklist domain-name-based firewall's functionality is fully predicated on a "setup." With respect to that "setup," the firewall's controller functions to enforce the domain name rules to selectively allow or deny access to a website or other Internet node with the domain name rules being established using a setup methodology via a communications channel of a command line interface, a web based interface or other solutions. In other words, in this firewall, the controller specifically acts upon domain name rules (i.e., whitelist/blacklist rules) that are statically input during setup in a manner that would be known to those skilled in the art.

The aforementioned firewall is fully predicated on the use of the traditional statically input whitelist/blacklist approach with the sole difference being that the statically input whitelist/blacklist operates on a domain name basis in addition to IP Addresses and Ports. This conventional firewall may utilize a dynamic process to potentially alter the content of the traffic data itself during the screening process, but as for the establishment of the allow/block rules during setup, they are static, being typically input at the time of install by a network administrator.

In alternative embodiments of this conventional firewall, source IP address, destination IP address, and port being utilized can be statically input as part of the setup process. Traditional firewalls have long been using a whitelist/blacklist approach which is applied to statically entered source IP addresses, destination IP addresses, and ports being used.

In short, conventional firewalls have done nothing outside the static paradigm of preselected whitelists and/or blacklists, which are typically input at the time of setup by a network administrator. This is one of the limitations that makes conventional firewalls unsuited to the provision of dynamic user control over browser-based traffic.

To permanently end computer hacking, computer operators must be able to monitor and control all traffic going in and out of their computers. Traditional firewalls do indeed provide traffic monitoring in addition to traffic control. However, traditional firewalls place great emphasis on controlling traffic based on previously input static whitelists and blacklists; the firewall's monitoring functions are treated as a separate, if not ancillary, part of the security paradigm. Traditional firewalls are not designed to be a continually-viewable, integral part of the user's browsing experience. This, in turn, has resulted in monitoring functionality that is of little, if any, value to assisting the user in taking dynamic, real-time control over the internet traffic. This, in turn, has allowed computer hacking and cyberattacks to grow at an exponential rate.

Some firewalls do provide complicated mechanisms which could (in theory) be used by highly-sophisticated users to take control over a substantial amount of traffic flowing in and out of the computer (provided the user is not only highly-sophisticated, but also willing to invest an incredible amount of time, energy, and effort to take such control). Having to choose between security and convenience is part and parcel of the cybersecurity industry. Security experts are trained to view "Usability" and "Security" as inversely proportionate to one another. For example, consider the textbook *CEH—Certified Ethical Hacker* by Michael Gregg. On page 6, this textbook teaches that "Usability" and "Security" are inversely proportionate to one another. Moreover, the textbook teaches that this is a "Security Fundamental." The textbook further teaches the presumed inherent inverse relationship using the diagram in FIG. 14. According to the textbook diagram: usability inherently decreases as security increases.

The presumed inverse relationship between usability and security is deeply ingrained in the minds of those ordinarily skilled in the art. For example, Luiz Firmino (CISSP, CISM, CRISC, CICISO) teaches the same presumed inherent inverse relationship between "security" and "ease of use." Firmino uses the diagram in FIG. 15 to teach this presumption.

Trade magazines have further solidified this mindset. For example, in "Why Convenience is the Enemy of Security," David Jeffers teaches that the choice between convenience and security "is a sliding scale that requires finding the right balance between the two."

This widely embraced presumption has resulted in two types of cybersecurity software: easy-to-use but insecure, or difficult-to-use but very secure. In "Security vs. usability: No one's winning," Rodney Gedda documents that "Usability of security software is partly to blame for low protection levels in many computers, according to international security experts."

Those ordinarily skilled in the art of cybersecurity strongly view "Usability" and "Security" as inversely proportional; and this deeply ingrained paradigm is reflected in their design of cybersecurity products, including traditional firewall implementations. To those ordinarily skilled in the art, easy-to-use yet highly secure firewall embodiments are not only nonobvious, they are considered impossible.

When it comes to firewalls, the highest form of security is a "Deny-All Approach." This approach begins by initially blocking all traffic; from that point forward, only traffic dynamically approved by the user is allowed through. This highest form of security has remained an elusive goal—likely due to the widely-held assumption that the highest form of security must inherently result in the lowest possible level of usability. This widely-held assumption prevents those ordinarily skilled in the art from even looking for a paradigm in which the highest form of security can be accomplished in a simple, easy-to-use manner. After all, such a notion runs contrary to the predominant cybersecurity paradigm.

In summation, the designers of traditional firewalls have failed to invent an easy-to-use, "Deny-All Approach" that is applicable to the unique characteristics of web-browser traffic. In fact, for those ordinarily skilled in the art, such a concept is considered inherently impossible.

Therefore, a need exists to solve the deficiencies present in conventional firewalls and their related methodologies. What is needed is an easy-to-use firewall that substantially secures a network. What is needed is a firewall that can be based on a dynamically updatable Deny-All Approach. What is needed is a firewall that is customizable to accommodate user traffic. What is needed is a firewall that integrates DNS traffic monitoring with traffic control of non-DNS data packets.

SUMMARY OF THE INVENTION

An aspect of the invention advantageously provides an easy-to-use firewall that substantially secures a network. An aspect of the invention advantageously provides a firewall that can be based on a dynamically updatable Deny-All Approach. An aspect of the invention advantageously provides a firewall that is customizable to accommodate user traffic. An aspect of the invention advantageously provides a firewall that integrates DNS traffic monitoring with traffic control over non-DNS data packets.

One aspect of the present disclosure provides an easy-to-use, "Deny-All Approach" that is applicable to the unique characteristics of web-browser traffic (in addition to providing "Deny-All Approach" protection for other internet-based applications as well). This is accomplished, in part, through tightly integrating a novel method of traffic monitoring with a novel method of traffic control. The present disclosure may create a "Traffic Requester" group. A Traffic Requester group includes at least one domain name derived from the internal contents of at least one DNS packet combined with at least one domain name associated with either the source IP Address and/or destination IP address of at least one non-DNS-based packet. The identity of each traffic requester communicated to the user may include the domain name itself, or a derivative of the domain name, or a pseudonym associated with the domain name, or the like. The novel traffic monitoring method may display these Traffic Requesters in real-time—whether such Traffic Requester is currently allowed or blocked. The novel traffic control method operates off a dynamically changing list of blocked and allowed domain names. Moreover, one implementation of the present invention initially begins with a "Deny-All Approach"; from that point forward users may dynamically toggle the status of displayed Traffic Requesters using the novel traffic monitoring method.

According to an embodiment of this disclosure, the invention features a firewall security platform for enhancing security of a network. The firewall security platform includes at least one interface to communicate the identity and current status of one or more traffic requesters and at least one device for receiving instructions from a user. Communication data packets associated with the one or more traffic requesters are allowed for communication via the network or denied and blocked by the firewall security platform based on the current status of each of the one or more traffic requesters. The user's instructions include making a selection, with the selection including members that are at least one of the one or more traffic requesters. The current status of each member of the selection is altered in response to the making of the selection.

In another aspect, the firewall security platform can further include a domain name validation process to validate the communication data packets by comparing the communication data packet with a traffic requester table and set the current status of the one or more traffic requesters associated with the communication data packets that fail validation as blocked. The firewall security platform can also further include a domain name reply integrity process to determine an integrity of the communication data packets by correlating a DNS reply received within a window with a corresponding DNS request and set the current status of the one or more traffic requesters associated with the communication data packets with DNS replies that cannot be correlated with the corresponding DNS request to blocked.

In another aspect, the firewall security platform can further include an IP exception list that allows a user's computer to communicate with IP addresses included by the IP exception list even if the IP addresses are unassociated with a known domain name.

In another aspect, the firewall security platform can further include a DNS exception list, wherein the DNS exception list includes the one or more traffic requesters that are associated with the current status of being allowed by the user.

In another aspect, the making of the selection can include temporarily unblocking the at least one member of the one or more traffic requesters, wherein the current status of the at least one member of the selection is temporarily allowed in response to the making of the selection of temporary unblocking.

In another aspect, the making of the selection can include temporarily blocking the at least one member of the one or more traffic requesters, wherein the current status of the at least one member of the selection is temporarily blocked in response to the making of the selection of temporary blocking.

In another aspect, the interface can provide the identity and current status of the one or more traffic requesters approximately instantaneously.

In another aspect, inbound traffic and outbound traffic associated with the one or more traffic requesters can be communicated substantially together via the interface substantially simultaneously.

In another aspect, the one or more traffic requesters can be includable in a traffic requester group, and the user can select the traffic requester group via the interface.

In another aspect, the current status can be defined as allowed or blocked, wherein the current status that is allowed permits communication of the communication data packets associated with the at least one of the one or more traffic requesters being allowed, and wherein the status that is blocked denies communication of the communication data packets associated with the at least one of the one or more traffic requesters being blocked.

In another aspect, the current status can be toggled between allowed and blocked in response to the making of the selection.

In another aspect, the security platform can be located between a network interface and an internet access device, wherein the security platform is located externally to a computer with the network interface.

In another aspect, the security platform can be located between a network interface and an operating system.

According to another embodiment of this disclosure, the invention can feature a firewall security platform for enhancing security of a network. The firewall security platform includes at least one interface to communicate the identity and current status of one or more traffic requesters and at least one device for receiving instructions from a user. Communication data packets associated with the one or more traffic requesters are allowed for communication via the network or denied and blocked by the firewall security platform based on the current status of each of the one or more traffic requesters. The user's instructions include making a selection, with the selection including members that are at least one of the one or more traffic requesters. The current status of each member of the selection is altered in response to the making of the selection. The firewall security platform further includes an IP exception list that allows the user's computer to communicate with IP addresses included by the IP exception list even if the IP addresses are unassociated with a known domain name. The firewall security platform also includes a DNS exception list that includes the one or more traffic requests that are associated with the current status that is allowed by the user. The one or more traffic requesters are includable in a traffic requester group, and the user selects the traffic requester group via the interface.

In another aspect, the firewall security platform can further include a domain name validation process to validate the communication data packets by comparing the communication data packets with a traffic requester table and set the current status of the one or more traffic requesters associated with the communication data packets that fail validation as blocked. The firewall security platform can also further include a domain name reply integrity process to determine an integrity of the communication data packets by correlating a DNS reply received within a window with a corresponding DNS request and set the current status of the one or more traffic requesters associated with the communication data packets with DNS replies that cannot be correlated with the corresponding DNS request to blocked.

In another aspect, the making of the selection can include temporarily unblocking the at least one member of the one or more traffic requesters, wherein the current status of the at least one member of the selection is temporarily allowed in response to the making of the selection of temporary unblocking. The making of the selection can include temporarily blocking the at least one member of the one or more traffic requesters, wherein the current status of the at least one member of the selection is temporarily blocked in response to the making of the selection of temporary blocking.

In another aspect, the current status can be defined as allowed or blocked, wherein the current status that is allowed permits communication of the communication data packets associated with the at least one of the one or more traffic requesters being allowed, and wherein the current status that is blocked denies communication of the communication data packets associated with the at least one of the one or more traffic requesters being blocked.

According to an embodiment of the present disclosure, a method of the invention can be used for enhancing security of a network via a firewall security platform. The method includes the steps of: (a) communicating an identity and current status of one or more traffic requesters via at least one interface; (b) allowing or blocking communication data packets associated with the one or more traffic requesters for communication via the network by the firewall security platform based on the current status of each of the one or more traffic requesters; and (c) receiving instructions that include making a selection by a user via at least one device. The selection includes members that include at least one of the one or more traffic requesters. The current status of each member of the selection is altered in response to the making of the selection.

In another aspect, the method can include the steps of: (d) validating the communication data packets by comparing the communication data packet with a traffic requester table; (e) setting the current status of the one or more traffic requesters associated with the communication data packets that fail validation as blocked; (f) determining an integrity of the communication data packets by correlating a DNS reply received within a window with a corresponding DNS request; and (g) setting the current status of the one or more traffic requesters associated with the communication data packets with the DNS replies that cannot be correlated with the corresponding DNS request to blocked.

In another aspect, the method can include the steps of: the steps of: (h) unblocking the at least one member of the one or more traffic requesters temporarily when the current status of the at least one member of the selection is temporarily allowed in response to the making of the selection of temporary unblocking; and (i) blocking the at least one member of the one or more traffic requesters temporarily when the current status of the at least one member of the selection is temporarily blocked in response to the making of the selection of temporary blocking.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 9 is a table view of a list of traffic requesters, according to an embodiment of this disclosure.

FIG. 10 is a table view of a list of traffic requesters with unblocking indications, according to an embodiment of this disclosure.

FIG. 11 is a table view of a list of annotated active talkers, according to an embodiment of this disclosure.

FIG. 12 is a table view of a list of annotated repeat talkers, according to an embodiment of this disclosure.

FIG. 13 is a table view of a list of website activity, according to an embodiment of this disclosure.

DETAILED DESCRIPTION

Figure 1:
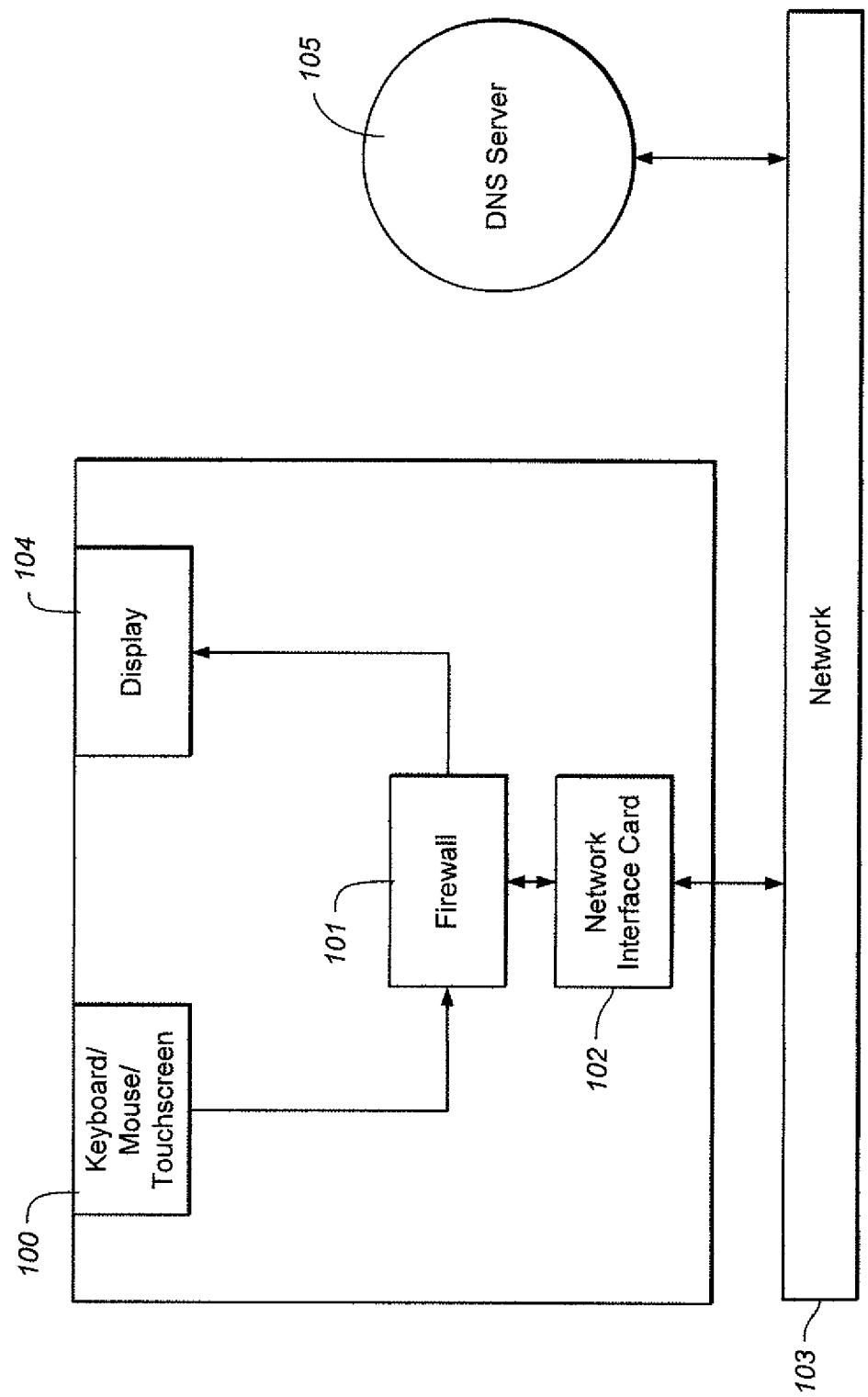
FIG. 1 is a block diagram view of an illustrative hardware system for operating the firewall, according to an embodiment of this disclosure.
Figure 2:
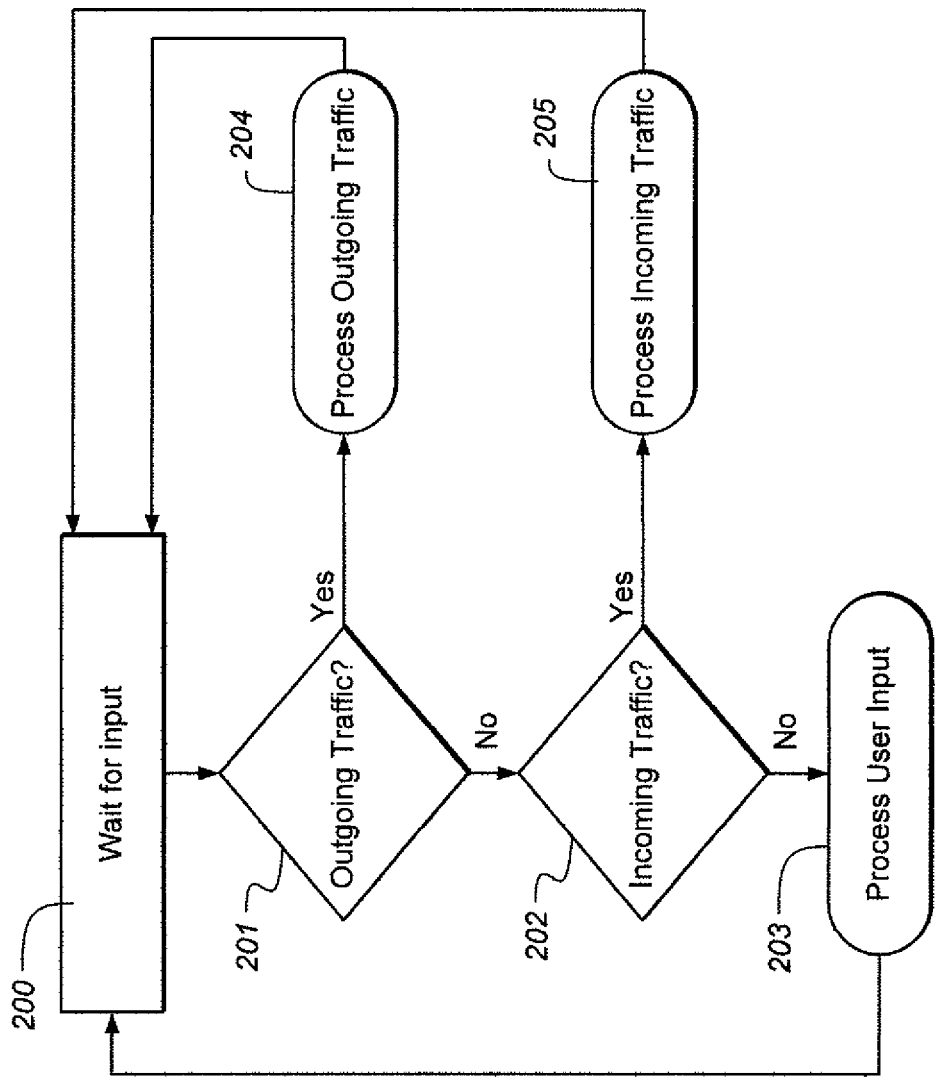
FIG. 2 is a flowchart view of an event-driven process, according to an embodiment of this disclosure.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Referring now to FIGS. 1-15, the firewall security system for computers with internet access will now be discussed in more detail. The firewall security system may alternatively be referenced as a network security enhancement system without limitation. The firewall security system may be communicably located between an application, for example, and operating system, and a network interface of a computer. Alternatively, the firewall security system may be external to a computer, for example, between the network interface and an internet access device such as a modem, router, or other device. The system may include a firewall security platform, and authentication platform, and an interface. The firewall security platform may include a DNS authentication process, a domain name validation process, and a domain name reply integrity process. The firewall platform may analyze a communication data packet, which may include comparing data to a Traffic Requester group. The system may operate one or more of these components interactively with other components to provide firewall and online security.

To permanently end computer hacking, computer operators must be able to monitor and control all traffic going in and out of their computers. The longstanding challenge has been to find a way to group and display traffic such that every data packet is accounted for without the user being overloaded with too much information. The other longstanding challenge has been to find a convenient method which empowers a user to substantially immediately respond to the information. This present invention solves both longstanding issues.

Internet-based computers can typically only talk to one another using numeric addresses (called IP Addresses). However, computer users do not typically use numeric IP addresses. Rather, they typically use domain names instead (e.g. www.apple.com). In order for the user's computer to communicate with the chosen site, the user's computer generally must first translate the domain name (e.g. www.apple.com) into a numeric IP Address (e.g. 17.178.96.59).

Owners of internet sites may register their numeric IP addresses and associated domain names with devices called DNS servers. For example, Apple has registered with DNS servers that www.apple.com is located at 17.178.96.59. The moment the DNS registration is complete, the user's computer can immediately obtain the IP Address of the site by querying a DNS Server, for example, via a DNS request.

For example, when a user enters a domain name into a browser (e.g. www.apple.com) the user's computer sends a DNS request to a DNS server. In essence, a DNS request asks the DNS server: "What is the IP Address of the following domain name?" For example, when a user enters www.apple.com into a browser, the user's computer sends a DNS request which essentially asks: "What is the IP Address of www.apple.com?"

The DNS Server responds to each DNS request using a DNS reply for its corresponding DNS request. The time between a DNS request and a corresponding DNS reply will be referred to throughout this disclosure as a window. In essence, a DNS reply says: "The IP address for the following domain name is . . . " For example, when a DNS request is sent for www.apple.com, the DNS server will send back a DNS reply which essentially says: "The IP address for www.apple.com is 17.178.96.59." The user's computer can now talk to www.apple.com via this numeric address. (It should be noted that domain names often have more than one IP address. In such instances, a DNS reply will contain multiple IP addresses. The user's computer is free to choose to use any of these IP Addresses when communicating with the chosen domain name.)

The present disclosure treats these DNS Data Packets as a distinct category of communication. The other two categories are Local Data Packets and Remote Data Packets. Internet-based computers often use a local network connection to talk to a router. This local traffic may remain solely between the user's computer and the router. (In other words, the router generally does not pass this traffic onto the internet.) Therefore, these Local Data Packets generally are not viewable to internet-based hackers. Typically, only packets coming from and/or destined for the internet (i.e. Remote Data Packets) are viewable by internet-based hackers. Thus, the present disclosure treats the following types of communication data packets to include distinct categories of traffic: DNS Data Packets, Local Data Packets, and Remote Data Packets. The communication data packets may be characterized via a traffic processor, which may operate as a component of the firewall security platform. Skilled artisans will appreciate additional types of data packets includable as a communication data packet after having the benefit of this disclosure.

Internet computers may use a communication language, for example, TCP/IP and/or UDP/IP. The designers of this communication language have reserved specific numeric address ranges for local traffic (as is well known in the art). The present disclosure uses the reserved local address ranges to identify Local Data Packets (as is also well known in the art). All other address ranges are presumed to be either destined for or coming from the internet. Therefore, in the interest of clarity for this disclosure, all other address ranges are presumed to be Remote Data Packets Skilled artisans will appreciate additional embodiments in which ranges of IP addresses can be otherwise classified, without limitation.

In addition to the internal division and processing of Data Packets, the present disclosure also provides a novel grouping of domain names for external display. This novel grouping is entitled Traffic Requesters. The domain names for the Traffic Requesters group is derived from three sources: the domain name associated with the destination IP address of outbound traffic, the domain name associated with the source IP address of inbound traffic, and the domain name embedded within DNS requests and replies. To qualify as a Traffic Requester group, there has to be at least one domain name derived from the internal contents of at least one DNS packet and there has to be at least one domain name associated with the source IP Address and/or destination IP address of at least one non-DNS-based packet. These domain names are members of the Traffic Requester group.

By merging the domain names embedded within DNS packets with domain names associated with IP addresses of non-DNS traffic, users are presented with a real-time list of Traffic Requesters. Users also are presented the identity and status of each Traffic Requester substantially instantaneously, which approximates real-time (e.g. "allowed/authorized" or "blocked/unauthorized"). Should the user desire to change the status of any Traffic Requester, the user can toggle the status of each Traffic Requester via a user input device, for example, with the single click of a mouse (in a mouse-driven implementation), a single tap of the screen (in a touchscreen implementation), etc. The user may provide instructions including a selection to the system via the user input device.

FIGS. 1-9 illustrate one embodiment of the present disclosure. The initial state of this embodiment blocks all Remote Data Packets (allowing only DNS Data Packets and Local Data Packets to pass through). Thus, this particular embodiment may implement a "Deny-All Approach" (at least in terms of internet-bound traffic) with the sole exception of DNS packets. Therefore, the illustrated embodiment is one implementation for preventing internet-based hackers from accessing and/or controlling a user's computer. (It also may prevent hackers from being able to use malware to leak sensitive information off the user's computer via the internet.)

While the embodiment in FIG. 1-9 implements a "Deny All Approach" (the highest possible form of security), ease-of-use has also been fully preserved. The user is provided an intuitive presentation of all Traffic Requesters via an interface—allowing the user to toggle the status of each Traffic Requester via a decision to allow or deny the communication, for example, with a single mouse click. In short, maximum security may be achieved along with maximal ease-of-use at the same time.

FIG. 1 illustrates the firewall device's control of and response to various hardware components. The illustrated embodiment directly controls one or more network interface cards 102 and one or more display interfaces 104. This particular embodiment directly responds to user input from a user input device, such as a keyboard, mouse or touchscreen 100; it also responds to each communication data packet attempting to leave or enter each network interface card 102. Skilled artisans will appreciate that a device that provides an input (i.e., a user input device) may include a mouse, trackball, pointing device, keyboard, joystick, gamepad, jog, dial, camera, button, switch, controller, voice command, microphone, touch screen, or other device that would be apparent to a skilled artisan after having the benefit of this disclosure.

The illustrated embodiment waits 200 until it receives one of three types of input: outgoing traffic 201, incoming traffic 202, or user input 203. Each type of input initiates a different process 203, 204, 205.

Figure 3:
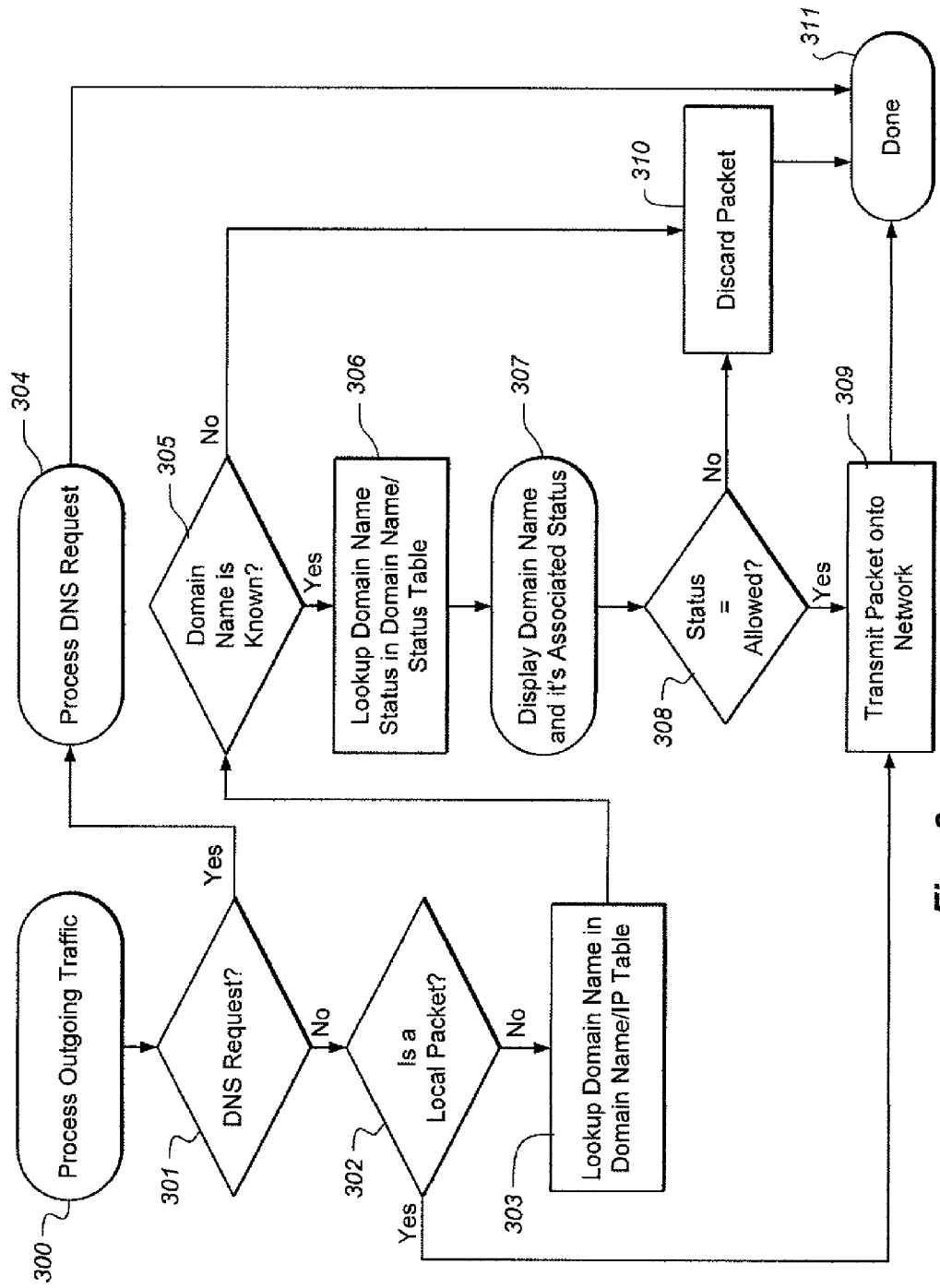
FIG. 3 is a flowchart view of an outgoing traffic processing operation, according to an embodiment of this disclosure.

FIG. 3 illustrates how outgoing traffic is processed in this particular embodiment 300. First, the embodiment determines whether the outbound traffic is a DNS request or not 301. If it is a communication data packet that includes a DNS request, then the DNS request is forwarded to a separate process 304 and the current process exits 311. If it is not a DNS request, this embodiment then checks to see if it is a local data packet 302. If it is a local data packet 302 then the packet is transmitted onto the network 309 and the process exits 311. If it is neither a DNS packet 301 nor a local packet 302 then it is a remote packet. In this case, the embodiment uses the destination IP address to obtain the associated domain name using the Domain Name/IP table (traffic requester table) 303.

Note: The embodiment illustrated in FIG. 1-9 may maintain two substantially real-time tables: Domain Name/IP table (also referred to as a traffic requester table) and Domain Name/Status table (also referred to as a status table). The Domain Name/IP table may keep track of all Domain Name/IP pairs listed in DNS Reply Packets. The Domain Name/Status table may keep track of the current status of each domain name (i.e. allowed or blocked). Status may be controlled dynamically by ongoing, substantially real-time user input. While the illustrated embodiment employs the use of tables, there are numerous data structures well-known in the art that can be used to store and retrieve the IP-Address(es) and the status associated with each Domain Name (examples include, but are not limited, to binary trees, database entries, sorted and unsorted arrays, linked lists, etc.). Such data structures can be used in conjunction with or in lieu of tables, either in part or in whole.

If no domain name is known for the destination IP Address 305 the outgoing packet is discarded 310 and the process exits 311. If the domain name is known 305 then the status of the domain name is obtained from the Domain Name/Status table 306. The domain name and its associated status are then displayed to the user 307. This authentication of a communication data packet is performed via a DNS authentication process of a firewall security platform.

If the status of the outgoing packet is "allowed" 308 then the packet is transmitted onto the network 309 and the process exits 311. If the status of the outgoing packet is not "allowed" 308 then the packet is blocked and/or discarded 311 and the process exits 311. (Notice that the Traffic Requester is externally displayed even when the internal packet gets discarded.) The validation of a communication data packet is performed via a domain name validation process of the firewall security platform.

Figure 4:
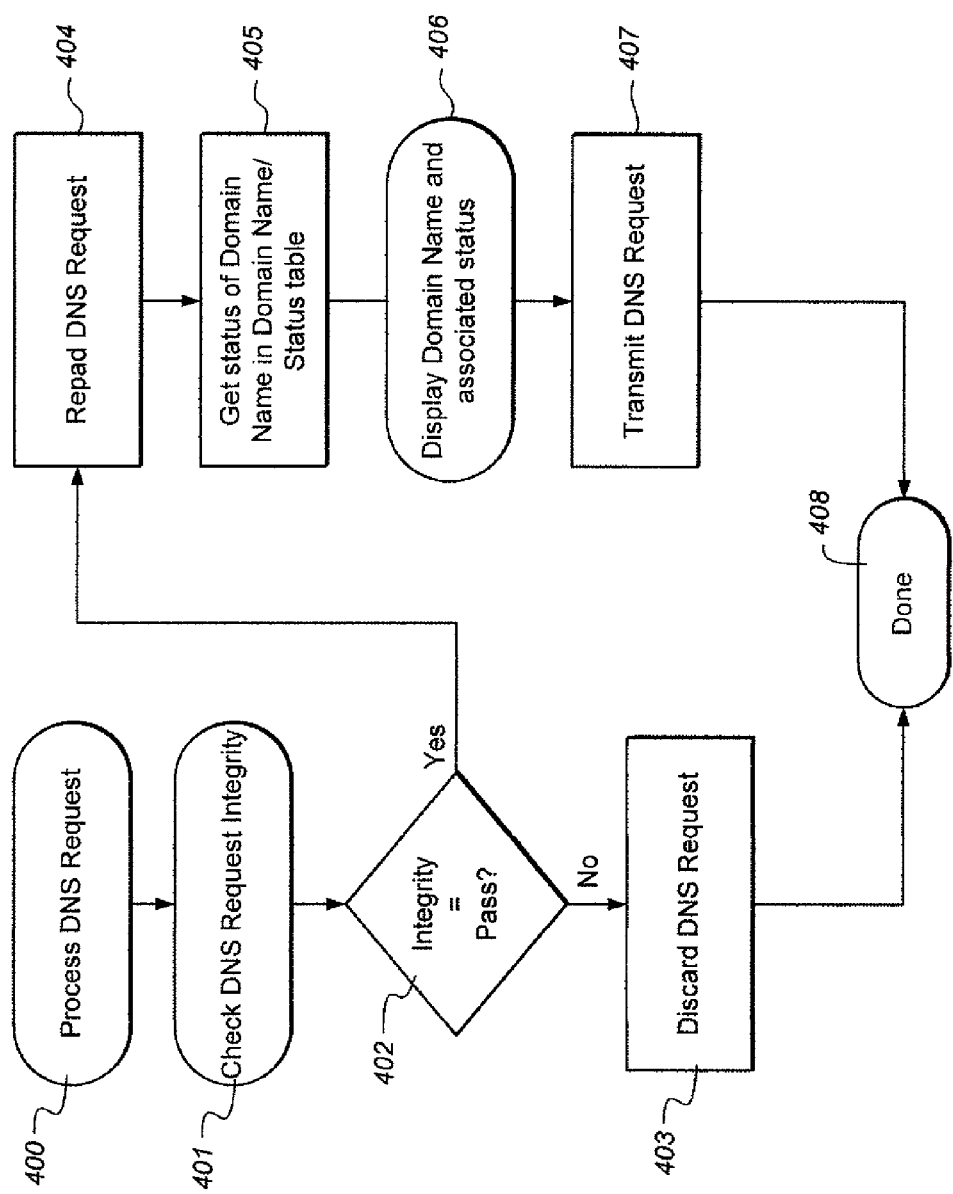
FIG. 4 is a flowchart view of a DNS request processing operation, according to an embodiment of this disclosure.

FIG. 4 illustrates how the DNS Request may be processed in one embodiment 400. First, the process checks the integrity of the DNS Request 401. If the integrity test does not pass 402 then the DNS Request is discarded 403 and the process exits 408. If the integrity test does pass 402 then the padded area of the DNS Request is overwritten (i.e. "repadded") 404. (This step prevents hackers from using the padded area of DNS packets to leak sensitive information off the user's computer.)

Next, the status of the domain name embedded within the DNS Request is obtained from the Domain Name/Status table 405. The Domain Name and its associated status are displayed 406. (Notice that the domain name displayed is the one embedded within the DNS packet [not a domain name associated with either the Destination IP Address or Source IP Address of the packet itself]. Thus, domain names from DNS packets are derived differently than domain names of non-DNS packets; yet all the domain names may be grouped together creating the Traffic Requester class regardless of their origin. This is one aspect of the novel Traffic Requester Paradigm.)

Regardless of status (e.g. "blocked" or "allowed"), the DNS request is transmitted to the DNS server 407 so that the IP Addresses associated with the domain name can be received and recorded in the Domain Name/IP table (traffic requester table). (Notice that "blocked" DNS Packets are still forwarded onto the network; whereas "blocked" Remote Packets are discarded.) The process then exits 408.

Figure 5:
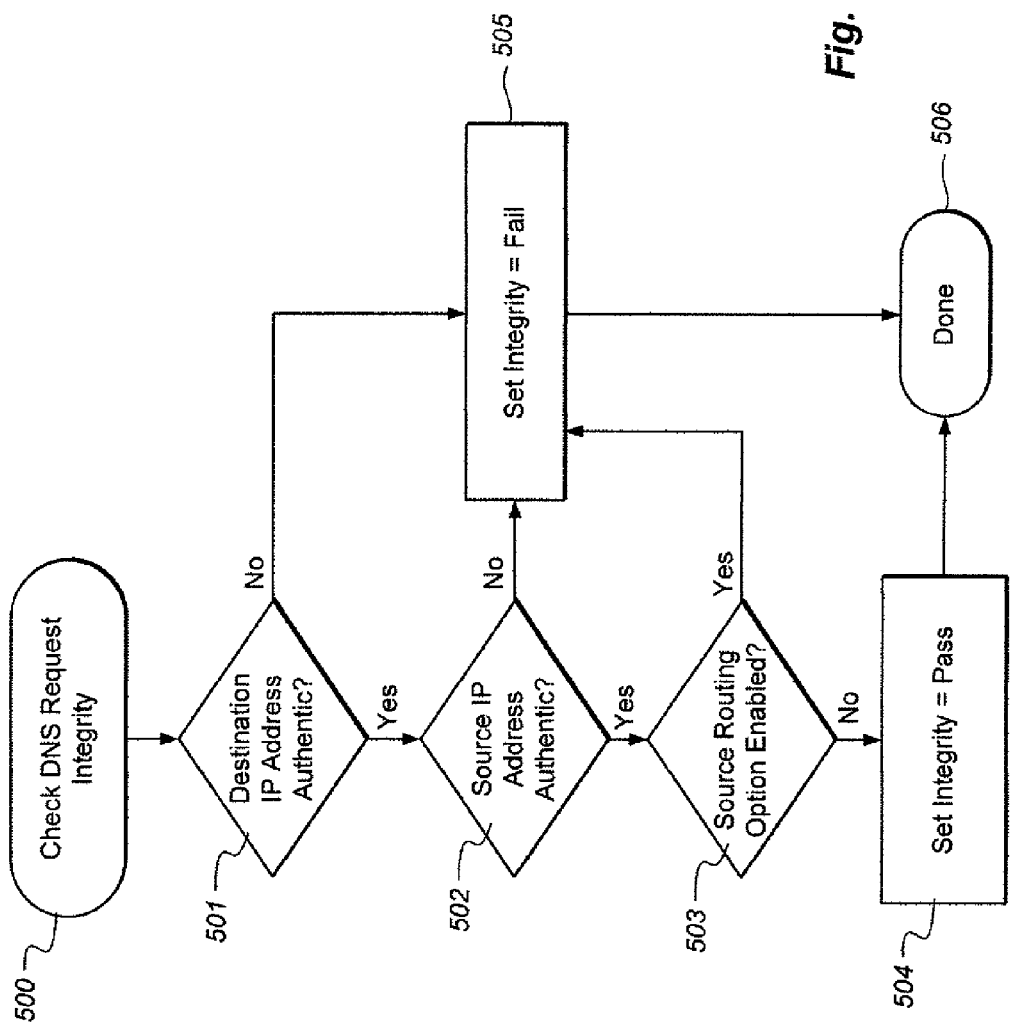
FIG. 5 is a flowchart view of a DNS request integrity processing operation, according to an embodiment of this disclosure.

FIG. 5 illustrates the DNS Request integrity test implemented in this particular embodiment. 500. First, the Destination IP Address is compared to the IP Addresses of all known DNS Servers 501. (Known DNS Servers can either be manually entered in at setup, or be obtained from the operating system, or be obtained from any other trusted source. All such methods are well-known in the art.) If the Destination IP Address does not match any known DNS Servers 501 then the integrity is set to "Fail" 505 and the subprocess exits 506. (Hackers sometimes stuff information into various areas of DNS packets and then use their own server IP addresses as the Destination IP Address. In this manner, sensitive user information hidden within DNS Request packets is directly forwarded to the hacker's computer. This DNS request integrity check 501 may prevent a hacker from executing such an attack.)

If the Destination IP Address matches a known DNS Server 501 then the Source IP Address is checked to see if it matches the known IP Address of the client PC 502. (The known IP Address of the client PC can be manually entered in at startup, or be obtained from the Operating System, or be obtained from any other trusted source. All such methods are well known in the art.) If the Source IP Address does not match any of the known IP Addresses for the client PC 502 then the integrity is set to "Fail" 505 and the subprocess exits 506. (This check prevents what is known as a "relay" hacking attack. In a relay attack, private information is stuffed into the packet using an authentic Destination IP Address for the DNS Server; however, the Source IP Address used is that of the hacker's computer. When most DNS Servers craft their DNS replies, they often copy the same padded area they received in the DNS requests. Savvy hackers make use of this. By sending data packets to a valid DNS Server, most firewalls allow the traffic to pass, and the firewall log entries only show that packets were sent to a valid DNS Server. However, since the Source address of the DNS Request is the hacker's computer, the DNS Server copies the user's sensitive information when it creates its DNS reply, and then the DNS Server sends the data-leak containing DNS Reply directly to the hacker's computer [since the DNS Server believed the DNS request came from the hacker's computer]. The DNS Server thus "relays" the sensitive information to the hacker's computer. Checking for authentic source IP Addresses 502 can prevent such "relay" attacks from occurring.)

If the Destination IP Address is authentic 501 and the Source IP Address is authentic as well 502, and thus valid, then this particular embodiment checks to see if the Source Routing option has been enabled on the packet 503. This check may be performed via a packet modifier process. If Source Routing is enabled 503 then the integrity is set to "Fail" 505 and the subprocess terminates 506. (Hackers often use source routing to siphon sensitive information off of client PC's. Source Routing allows a hacker to specify an IP Address through which the data packet must pass on its way to the Destination Address. Hackers can use Source Routing to force the internet routers to deliver data-leak packets directly to their computers before these packets ever arrive at the destination specified by the Destination IP Address. Discarding Source Routing Packets 503, 504 can prevent this type of attack.) It should be noted that some alternative embodiments of this present invention can include a source routing check for substantially all outbound traffic, in which case either the source routing option is stripped from the packet or the packet is discarded altogether as not being authenticable. Stripping of source routing data may be performed via the packet modifier process. The previously blocked communication data packet with the source routing data removed may now be a substantially secured communication data packet, which can be authenticable and thus not blocked.

If the Destination IP Address is authentic 501 then the packet is destined for an authentic DNS Server. If there is no Source Routing enabled on the packet 503 then the DNS request will travel straight from the user's computer to the DNS Server without visiting any other computers en route. And if the Source IP Address is authentic 502 then the DNS sends its reply directly back to the user's computer. Thus, when all three of these conditions are met, there is not any way for a hacker to use DNS-based packets for leaking sensitive information. Therefore, this particular embodiment sets the integrity to "Pass" when all three of these conditions have been met 504. Then the process exits 506.

The illustrated embodiment initially implements a "Deny All Approach" for all Remote Data Packets. Thus, all internet-bound packets are blocked—with the sole exception of DNS packets. Therefore, by implementing strict integrity checks for all DNS packets, the initial state of this particular embodiment has achieved maximum possible security (at least in terms of internet-based cybersecurity). It is then up to the user to purposefully allow any other traffic above and beyond this.

Note: Various embodiments will implement the Traffic Requester Paradigm based upon the needs of the user. While the illustrated embodiment is one implementation to protect against internet-based hackers, a different embodiment may be chosen for users in a corporate environment in which multiple users share a local network. Such embodiments may choose to replace the Local Traffic class with an IP Exception class instead (as is discussed further in this disclosure). Other alternatives for corporate environments are discussed further in this disclosure.

Figure 6:
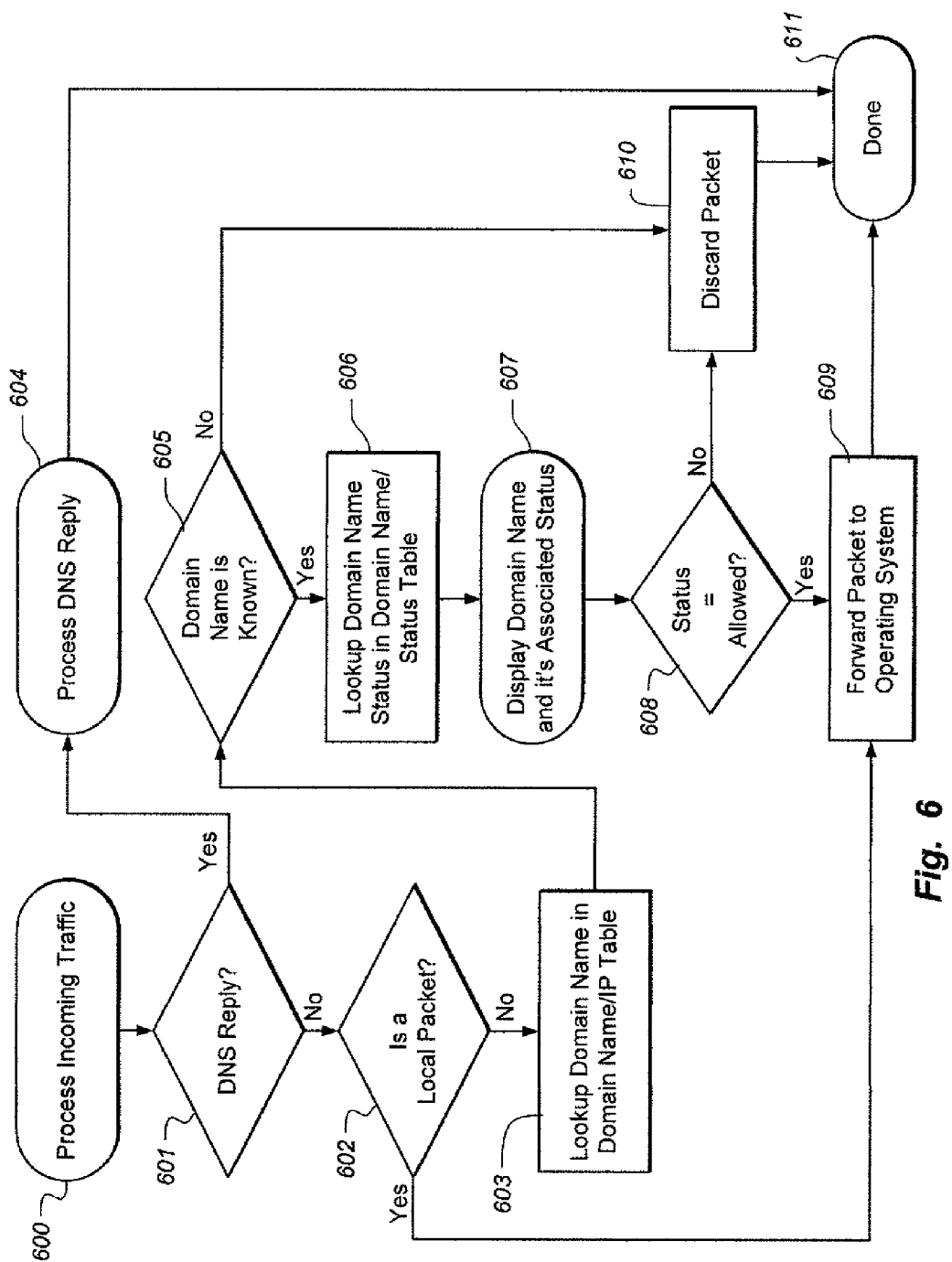
FIG. 6 is a flowchart view of a processing operation of incoming traffic, according to an embodiment of this disclosure.

FIG. 6 shows how incoming traffic is processed in the illustrated embodiment 600. If the incoming data packet is a DNS Reply 601 then the DNS Reply is forwarded to a separate process 604 and then the current process exits 611. This process is performed via a domain name reply integrity process. If the data packet is not a DNS Reply 601 then the process checks to see if it is a local packet 602. If it is a local packet 602 then the packet is forwarded to the Operating System 609 and then the process exits 611. If the packet is neither a DNS packet 601 nor a local packet 602, then it is a remote packet. Therefore, the process uses the Source IP Address to obtain the associated domain name using the Domain Name/IP table (traffic requester table) 603. If the domain name is not known 605 then the packet is discarded 610 and the process exits 611. If the domain name is known 605 then the status of the domain name is obtained from the Domain Name/Status table 606. The domain name and its associated status is then displayed 607.

If the status of the displayed domain name is not "allowed" 608 then the packet is discarded 610 and the process exits 611. If the status of the displayed domain number is "allowed" 608 then the packet is forwarded to the Operating System 609 and then the process exits 611.

Figure 7:
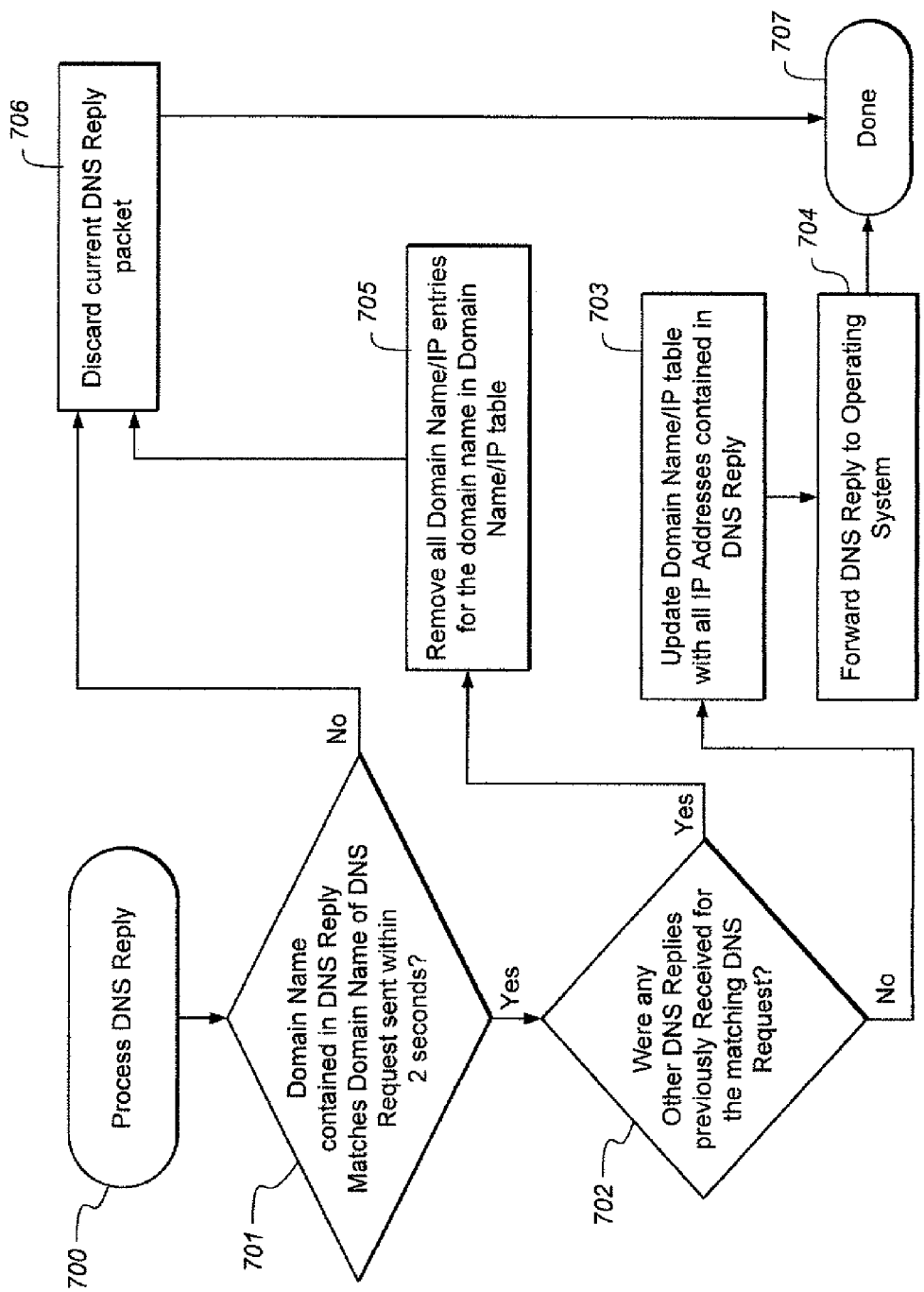
FIG. 7 is a flowchart view of a DNS reply processing operation, according to an embodiment of this disclosure.

FIG. 7 illustrates how DNS Replies are processed in this particular embodiment 700. The process checks to see if the domain name embedded in the DNS Reply matches the domain name embedded in any DNS Request made within a window, for example, the last two seconds 701. (This prevents a hacker from creating his own DNS Reply and then sending it to the user's computer. For example, if a hacker knows that a user often visits www.apple.com then the hacker can create his own DNS reply packet which says that www.apple.com is located at the hacker's IP Address. Then, when the user enters www.apple.com into his browser, all his Apple-bound traffic will go to the hacker's computer. The hacker can then attach sensitive user information to Apple-bound traffic, having the sensitive information delivered directly to his computer. Moreover, by sitting the in the middle of the user's Apple traffic, the hacker can both send and receive packets—allowing the hacker to use this communication to take total control over the user's computer. Ensuring that DNS Replies match previously sent DNS Requests 701 is one of the checks necessary to prevent this type of attack. The other check required is 702 discussed below.)

If the domain name in the DNS Reply does not match any domain names in recently sent DNS Requests 701 then the DNS Reply is discarded 706 and the process exits 707. If the domain name does match 701 then the process checks to see if multiple DNS Replies have been received for the matching DNS Request 702. If multiple DNS Replies have been received for the DNS Request then the DNS/IP Pairs of the previously matched DNS Replies may be removed from Domain Name/IP table (traffic requester table) 705; the current DNS Reply is discarded 706 and then process terminates 707. (Check 701 looks for hacker-crafted DNS Replies which were sent without any DNS Request being initiated by the user. Check 702 looks for hacker-crafted DNS replies which were created by the hacker in direct response to a user-transmitted DNS request. Check 702 protects against "man-in-the-middle attacks." In "man-in-the-middle attacks," hackers send their own DNS Reply in response to the user's DNS Request. The user's computer will therefore receive IP Addresses from both the DNS Server and from the hacker as well. If his computer selects the hacker-provided IP Address then the hacker has unfettered access to the user's computer. By removing all Domain Name/IP Pairs when multiple DNS Replies are detected, the user is highly protected from this fairly popular hacking technique.)

If the domain name in the DNS reply matches the domain name of a recently sent DNS request 701 and there is only one DNS reply received for the DNS request 702 then the DNS Reply is considered authentic (in this particular embodiment). Therefore, the process updates the Domain Name/IP table (traffic requester table) with the received IP Address(es) for the embedded domain name 703. Then the DNS Reply is forwarded to the Operating System 704 and then the process exits.

Before discussing user input (FIG. 8), it is perhaps more helpful to discuss what the user may see on the display. FIG. 9-13 illustrate different displays used by various embodiments, which may provide feedback to a user.

In FIG. 9, which provides feedback regarding allowed and blocked domains, allowed domains may be displayed in regular font and blocked domains may be displayed in bold. Hence, in FIG. 9, the following two domains are currently "allowed": www.apple.com and images.apple.com; whereas the following domain is currently "blocked": metrics.apple.com.

There are many alternatives for representing the identity and/or state of each domain. For example, color can be used. (As but one example: Green can be used for domains which are allowed and black can be used for domains which are blocked.) Another alternative would be to change the background based on status. Yet another alternative would be to annotate which domains are "allowed" and which domains are "blocked." Any manner of presentation designating the status of a displayed Traffic Requester group, or one or more members of the Traffic Requester group, falls within the spirit and scope of this present disclosure. (A Traffic Requester group includes one or more domain names as members derived from the internal contents of at least one DNS packet, and one or more domain names associated with either the source IP Address or destination IP address of at least one non-DNS-based packet.)

In a two-state implementation (such as FIG. 9), a user can simply toggle the current state with a single click of the mouse (in a mouse-driven implementation), a single tap of the screen (in a touchscreen implementation), etc. Any manner of selecting one or more Traffic Requesters for the toggling of the current status of said Traffic Requesters falls within the spirit and scope of this present disclosure.

FIG. 10 illustrates an embodiment which implements "temporary unblocking." When browsing the internet, a user might want to only temporarily allow access a new site. FIG. 10 illustrates one way to use the Traffic Requester Paradigm to accomplish this goal. In this illustration, feedback relating to the number of hours for which a site is "unblocked" is displayed to the right of the domain name. In this particular implementation, a "*" indicates permanent unblocking while a number indicates that access is only temporarily unblocked for the stated number of hours. In FIG. 10, the following domains are permanently unblocked (until the user specifies otherwise): www.apple.com and images.apple.com; however, the following domain will remain unblocked solely for the next three hours: metrics.apple.com.

One method of input for the FIG. 10 embodiment includes: long-click for permanent unblocking and one or more short-clicks for temporary unblocking. For example, if the user wants to permanently allow www.apple.com, he presses the mouse button until the "*" appears. If the user wants to only allow metrics.apple.com to communicate for three hours, he quickly presses the mouse button three times. Naturally, there are many other ways to differentiate between permanent and temporary unblocking. Any method of inputting and designating temporary unblocking for one or more displayed Traffic Requesters falls within the spirit and scope of this disclosure.

FIG. 11 illustrates one embodiment with feedback which annotates current/recent talkers. In this particular embodiment, current/recent talkers are annotated via "*". In this particular embodiment, any site with which the user's computer communicated within the last five seconds is annotated as a current/recent talker. Such an embodiment is useful for users who want to identify which internet sites are tracking them. Consider the following example: When a user types in "www.apple.com," the firewall will automatically display three Traffic Requesters: www.apple.com, images.apple.com, and metrics.apple.com. (Apple's current website tries to communicate with all three of these domains.) For illustration purposes, if the user toggles the status of all three domains to "Allow," and if the user moves to another website such as www.mail.com (Mail.com's website currently tries to communicate with all the other domains displayed in FIG. 11.), while using mail.com, the user notices that metrics.apple.com starts talking. (The "*" annotation alerts the user to this.) Now the user is aware that metrics.apple.com is tracking his behavior—even after he has left the Apple website. If the user does not like having his behavior tracked by Apple, he can simply click on metrics.apple.com to put a permanent end to Apple's tracking.

Naturally there are many ways to designated current and/or recent talkers (i.e. sites with which the computer has recently communicated with). Also, there are many different ways to determine whether a site qualifies as a current and/or recent talker. Any method of calculation of and any method of designating current/recent talkers falls within the disclosed Traffic Requester Paradigm—provided such calculations and designations are for one or more Traffic Requester groups.

One feature not readily apparent in FIG. 11 is the notion that "blocked" sites can also be "current talkers." This is illustrated by the "b.scorecardresearch.com" entry. Notice that this entry is bolded (hence the site is blocked), yet it is also annotated as a "current talker" as well (it is annotated with "***"). "Blocked" "current talkers" occur when a DNS Request is sent for a currently blocked site. Hence, the embodiment illustrated in FIG. 11 communicates the following to the user: b.scorecardresearch is currently trying to talk, but is being blocked from doing so.

The display of "blocked" "current talkers" allows users to easily correct any mistakes that they may have made. For example, www.mail.com can only function properly if the user's computer also has access to i2.mail.com. However, most users will not know this, and therefore, some might not toggle i2.mail.com to "Allow." Mail.com will be unoperational. However, the user will see that i2.mail.com (a currently "blocked" Traffic Requester) is trying to communicate (i.e. it is a "current talker"). The user can then toggle the status of i2.mail.com to "Allow" with a click of the mouse, in which case the mail.com site will now function perfectly.

The ability to instantly and easily correct any mistakes is paramount to a successful firewall implementation. The Traffic Requester Paradigm displays exactly the right information that the user needs to correct any mistakes at just the right time. Therefore, a user will likely be very relaxed in toggling the status of sites since he or she knows that any mistake can be easily undone in a single click. The embodiment illustrated in FIG. 11 is but one embodiment that provides this capability.

FIG. 12 illustrates an embodiment with feedback which annotates repeat talkers. A repeat talker is any site that goes silent for a given period of time and then begins to communicate afresh. In the particular embodiment in FIG. 12, the length of the arrow is based on the number of times that the site has gone silent and then begun communicating again. In FIG. 12, metrics.apple.com has come back online three times since the user left the Apple website (">" for the first time it came back online, "->" for the second time it came back online, and "-->" as illustrated to designate the third time it came back online). Annotating "repeat talkers" is yet another method for quickly identifying both tracking and malicious sites. Any method of annotating repeat talkers falls within the spirit and scope of this present disclosure—provided that the annotation of repeat talkers is being applied to one or more Traffic Requester groups.

FIG. 13 illustrates an embodiment which annotates which domains are related to each other. In this embodiment, a space may appear on the display each time the user's computer is silent for a given period of time. In FIG. 13, the user first accessed Apple's website which caused the following three Traffic Requesters to spring into action: www.apple.com, images.apple.com, and metrics.apple.com. While visiting Apple's site, the user's computer was silent for a moment. During this time, the firewall added a space on the display. Then when the user visited another site (www.mail.com in FIG. 13) all the Traffic Requesters are now conveniently grouped together. The grouping of Traffic Requesters based on computer silence allows a user to instantly recognize which domains belong to Apple and which domains belong to the mail service. For certain types of users, this information can be helpful. Any visual grouping of Traffic Requesters falls within the spirit and scope of this disclosure.

FIG. 9-13 illustrate a variety of displays. For each embodiment, the type of information displayed will depend on needs of the target audience. Within the Traffic Requester Paradigm, the following may be optionally displayed (in addition to domain name and current status): temporary unblocking (optionally also with the amount of time remaining displayed); designation of current and/or recent talkers; designation of repeat talkers, grouping of domain names based on either silence, continuance of communication, or perhaps even based on the website content itself. The use of none, one, or more of these options within the Traffic Requester Paradigm falls within the spirit and scope of this present disclosure.

Figure 8:
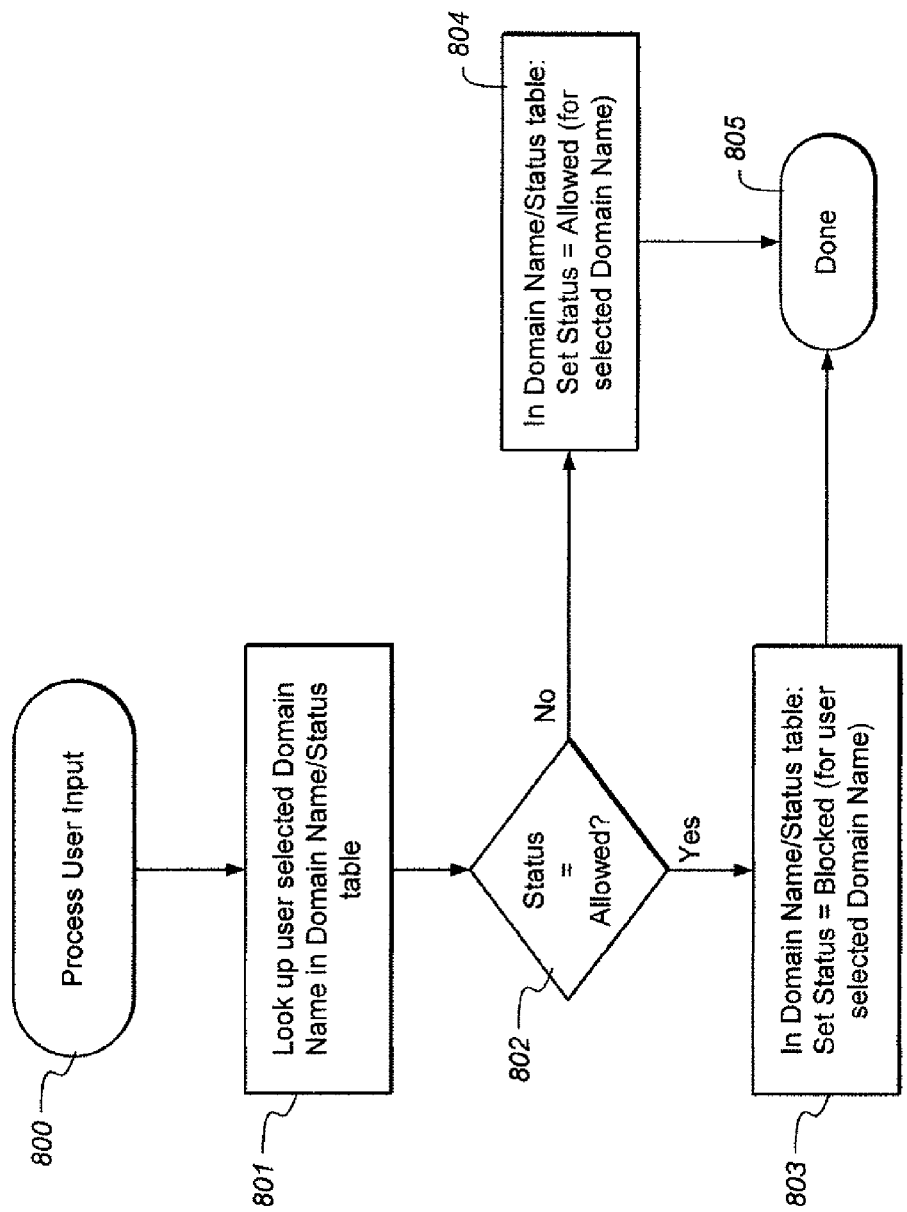
FIG. 8 is a flowchart view of a user input processing operation, according to an embodiment of this disclosure.
Figure 14:
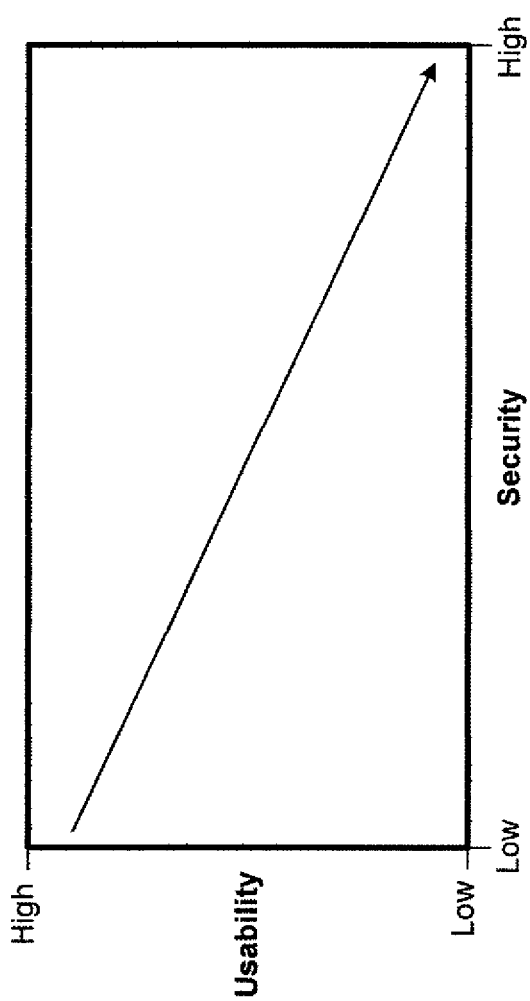
FIG. 14 is a diagram view of a presumed inverse relationship between security and usability, as taught by Michael Gregg and known in the prior art.
Figure 15:
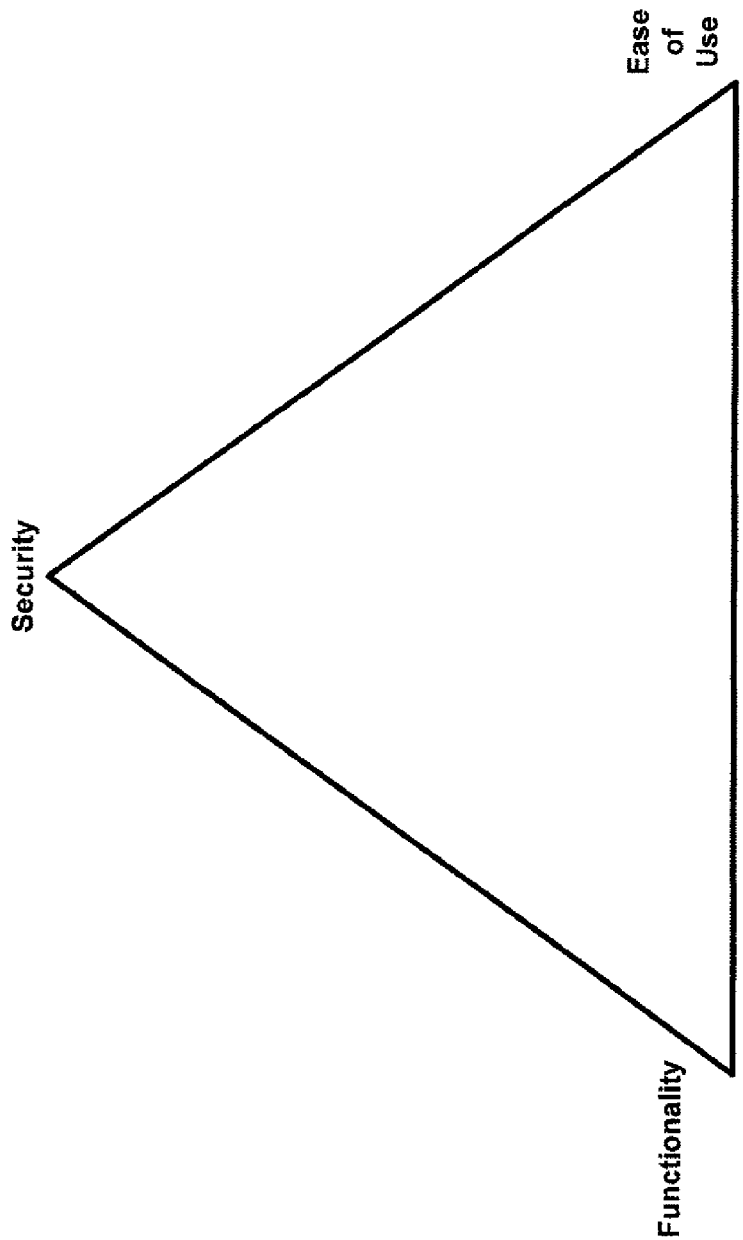
FIG. 15 is a diagram view of a presumed inverse relationship between security and ease-of-use, as taught by Luiz Firmino and known in the prior art.

With the display in mind, the processing of user input is more readily understandable. FIG. 8 illustrates one embodiment's implementation of processing user input 800. In this particular embodiment, one domain is selected by a user at a time. (Alternatively, multiple domains can be simultaneously selected in other embodiments.) The status of the user-selected domain name is obtained from the Domain Name/Status table 801. If the domain name has an entry and that entry is "Allowed" 802 then the Domain Name/Status table is updated by setting the current status to "Blocked" 803 and the process exits 805. If the status of the user-selected domain name is not "Allowed" 802 then the Domain Name/Status table is updated by setting the current status to "Allowed" 804 and then the process exits 805. This operation may be performed via an authorization platform, which may provide the user with a decision whether to allow or deny communication of a communication data packet on the network, for example, for a domain name. Communication data packets that are denied by the decision may be discarded. Communication data packets that are allowed by the decision may be communicated via the network.

An embodiment encompassing a best mode of the invention will now be discussed. This embodiment includes a firewall security platform for enhancing security of a network. The firewall security platform includes at least one interface to communicate the identity and current status of one or more traffic requesters. Communication data packets associated with the one or more traffic requesters are allowed for communication via the network or denied and blocked by the firewall security platform based on the current status of each of the one or more traffic requesters. The firewall security platform also includes at least one device for receiving instructions from a user. The user's instructions include making a selection. The selection includes members that include at least one of the one or more traffic requesters. The current status of each member of the selection is altered in response to the making of the selection.

FIG. 1-9 illustrate one full embodiment of the Traffic Requester Paradigm. FIG. 10-13 illustrate various optional displays for providing feedback to a user.

Alternative embodiments exist both for the internal processing of data packets as well as the external display of one or more Traffic Requester groups.

For example, one embodiment implements an "IP Exception List". The "IP Exception List" allows the user's computer to communicate with the listed IP addresses—even if the IP addresses do not have any known domain names. Such a list could be useful in implementations in which a VPN is used. Such a list could also be useful in any computing environment in which multiple computers share access to the same local network. "IP Exception Lists" can be used in lieu of allowing all Local Data Packets, or they can be used in addition to this aspect.

It is also possible for embodiments to use none, one, or multiple of the packet verification processes discussed in the embodiment illustrated in FIG. 1-9. A tremendous amount of security and control is afforded by the Traffic Requester Paradigm itself—with or without the additional packet verification and scrubbing processes.

Some embodiments can use whitelists and/or blacklists as a base, and then allow the user to dynamically control the traffic thereafter. A whitelist and/or blacklist may also be referred to as a DNS exception list. Such embodiments could optionally annotate Traffic Requesters that are included in the whitelist and/or blacklist. As but one example, all blacklisted Traffic Requesters could be annotated with "---". Thus, the user would see that the site is not only blocked, but it is on the blacklist as well. This would empower the user to make a highly informed choice on whether to unblock the Traffic Requester or not.

Well known in the art are lists which state the type of various websites (e.g. gun, religious, pornographic, etc.) Some embodiments could integrate these well-known lists with the novel Traffic Requester Paradigm. Such embodiments could annotate what type of site is associated with each Traffic Requester.

Some embodiments could display derivatives of the Traffic Requester domain names instead of the domain names themselves. For example, "Apple" could be displayed instead of, or in addition to, "www.apple.com"; "Apple—Images" could be displayed instead of, or in addition to, "images.apple.com." Such derivatives could be derived from lists. In another embodiment, such derivatives could be algorithmically derived from the domain names themselves. In still another embodiment, such derivatives could be derived from a combination of lists and algorithms.

Some embodiments may provide temporary blocking of Traffic Requesters, temporary unblocking of Traffic Requesters, neither, or both.

Some embodiments may default to progressive temporary unblocking. For example, the amount of time for temporary unblocking can be based on the number of times the Traffic Requester has been unblocked. (Perhaps the first unblocking last for only two hours; the next unblocking lasts for a day; the next unblocking lasts for a week; the next unblocking lasts for a month; etc. Any method of variable temporary unblocking (and/or variable temporary blocking) applied to one or more Traffic Requester groups falls with the spirit and scope of this present disclosure.

Conclusion, Ramification, Scope

To permanently end computer hacking, computer operators must be able to monitor and control all traffic going in and out of their computers. After all, when a user has total control over the traffic going in and out of his computer then the hacker has no control whatsoever. The Traffic Requester Display paradigm finally gives users substantially absolute control over all traffic going in and out of their computers.

The Traffic Requester Display Paradigm provides one-click management of communication to each member of the Traffic Requester group—making substantially total control over traffic simple and convenient while simultaneously achieving the maximum possible security: Firstly, the user sees the essentially bare minimum information necessary to make informed decisions (e.g. domain names and their associated status); secondly, the user is required to make the essentially bare minimum amount of effort to express whatever decision is made (e.g. a single mouse click to toggle the status or simply do nothing at all to allow the status to remain). It should be stressed that the user typically only sees information which is relevant to him (e.g. domain names such as "www.apple.com"). It should also be stressed that this paradigm allows for the Deny All Approach to finally be achievable in real-world use.

There are many non-obvious ramifications to the Traffic Requester Display Paradigm. For example, this paradigm provides for almost effortless correction of mistakes. Traditional firewalls are notoriously unforgiving when mistakes are made. Sometimes users even need to reinstall their entire operating system when a mistake is made (when the erroneously configured firewall is integrated into the Operating System itself). But the Traffic Requester Display Paradigm not only reduces mistake correction down to a single mouse click, but it also provides the user with the information necessary to correct the mistake at just the right time. The elegant presentation of information allows the user to almost effortless reverse decisions on the fly. This has tremendous ramifications on the usability and therefore ultimate effectiveness of this methodology.

The longstanding challenge has been to find a way to group and display traffic such that every data packet is accounted for without the user being overloaded with too much information. The other longstanding challenge has been to find a convenient mechanism to allow a user to immediately respond to information. The Traffic Requester Paradigm disclosed herein finally solves both challenges. By displaying the domain names of the novel Traffic Requester group, every packet is accounted for in a manner that is easy and intuitive for the user. And, by having the user toggle the status with a single click of the mouse, virtually nothing could be simpler for the user.

Accordingly, the reader will see that the highest possible form of security (i.e. the "Deny-All Approach") can be fully achieved in a convenient, easy-to-use manner (contrary to the deeply ingrained presumption and "security fundamental" embraced by those ordinarily skilled in the art). A real-time traffic monitor based on the Traffic-Requester Paradigm is an elegant counterpoint to the longstanding belief in a supposed inverse relationship between convenience and security. Through tightly integrating this novel traffic monitoring methodology with a dynamic traffic control methodology, the gaping hole in PC cybersecurity is finally essentially closed via this easy-to-use, "Deny-All Approach" that is applicable to the unique characteristics of web-browser traffic.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for enhancing computer and network security, the system comprising:
   a computer system comprising:
      at least one processor and associated memory storage;
      at least one network interface card;
      at least one user input device for receiving an instruction from a user, wherein a current status of each traffic requester of one or more traffic requesters is alterable between an allowed status and a blocked status based on the instruction received from the user, wherein the user uses the user input device to select at least one of the one or more traffic requesters displayed on at least one interface, and wherein the current status of each traffic requester that has its current status altered by the user is saved in the associated memory storage for reference by a firewall when the firewall is filtering data packets sent to and received from each of the one or more traffic requesters; and at least one display interface;

all of the foregoing forming the firewall, the firewall comprising:

a computer-implemented process for receiving at least one DNS reply from the at least one network interface card;

storing domain name and associated IP address contents of at least one received DNS reply packet in the computer system's associated memory storage;

receiving at least one non-DNS packet destined to or received from the at least one network interface card;

generating a traffic requester identity from a remote host IP address of a non-DNS packet combined with stored DNS reply contents in the computer system's associated memory storage; and displaying at least one traffic requester identity and its current status on the at least one display interface;

wherein communication data packets associated with one or more traffic requester identities are allowed for communication via the network or denied and blocked by the firewall based on the current status of each of the one or more traffic requester identities, wherein an initial status of all communication data packets received for the first time from a new traffic requester identity of the one or more traffic requester identities is set to a default status of allowed or blocked;

an IP exception list that allows a computer to communicate with IP addresses included by the IP exception list even when the IP addresses are unassociated with a known domain name; and a DNS exception list comprising one or more traffic requests that are associated with the current status that is allowed by the user;

wherein the one or more traffic requesters are included in a traffic requester group;

wherein the user selects the traffic requester group via the at least one display interface;

wherein selection of a traffic requester identity of the one or more traffic requester identities displayed on the at least one display interface using the user input device temporarily unblocks the selected traffic requester identity when the current status of the selected traffic requester identity is temporarily allowed in response to the making of the selection of temporary unblocking; and wherein the selection of a traffic requester identity of the one or more traffic requester identities displayed on the at least display interface using the user input device temporarily blocks the selected traffic requester identity when the current status of the selected traffic requester identity is temporarily blocked in response to the making of the selection of temporary blocking.

2. The system for enhancing computer and network security of claim 1, wherein the at least one display interface provides an identity and current status of the one or more traffic requester identities approximately instantaneously.

3. The system for enhancing computer and network security of claim 1, wherein inbound traffic and outbound traffic associated with the one or more traffic requester identities is communicated substantially together via the at least one display interface substantially simultaneously.

4. The system for enhancing computer and network security of claim 1, wherein the one or more traffic requester identities are included in a traffic requester group, and wherein the user selects the traffic requester group via the at least one display interface using the user input device.

5. The system for enhancing computer and network security of claim 1, wherein the current status that is the allowed status permits communication of the communication data packets associated with the at least one of the one or more traffic requester identities having the allowed status, and wherein the status that is the blocked status denies communication of the communication data packets associated with the at least one of the one or more traffic requester identities having the blocked status.

6. The system for enhancing computer and network security of claim 5, wherein the current status of a selected traffic requester identity of the one or more traffic requester identities is toggled between the allowed status and the blocked status in response to the selection of the selected traffic requester identity by the user on the display interface using the user input device and altering the current status of the selected traffic requester identity using the user input device.

7. The system for enhancing computer and network security of claim 1, wherein the firewall is located between the at least one network interface card and an Internet access device, wherein the firewall is located externally to the computer system comprising the at least one network interface card.

8. The system for enhancing computer and network security of claim 1, wherein the firewall is located between the at least one network interface card and an operating system.

9. The system for enhancing computer and network security of claim 1, further comprising:

a domain name reply integrity process to determine an integrity of the communication data packets by correlating the at least one DNS reply received from the at least one network interface card with a corresponding DNS request and setting to blocked the current status of the one or more traffic requester identities when multiple DNS replies are received in response to the corresponding DNS request.

10. A firewall security platform for enhancing computer and network security, the firewall security platform comprising:

a firewall device for enhancing computer and network security, the firewall device comprising:

a processor and associated memory;

at least one network interface card for receiving and transmitting data packets;

at least one display interface to communicate an identity and a current status of one or more traffic requesters;

wherein communication data packets associated with the one or more traffic requesters are allowed for communication via the network or denied and blocked by the firewall device based on the current status of each of the one or more traffic requesters, wherein a default status of all communication data packets received for the first time from a new traffic requester of the one or more traffic requesters is allowed or is blocked until changed by a user;
a user input device for receiving an instruction from the user, wherein the current status of each traffic requester of the one or more traffic requesters is alterable between an allowed status and a blocked status based on the instruction received from the user, wherein the user uses the user input device to select at least one of the one or more traffic requesters displayed on the at least one display interface, and wherein the current status of each traffic requester that has its current status altered by the user is saved in the memory for reference by the firewall device when filtering data packets sent to and received from each of the one or more traffic requesters;
an IP exception list that allows a computer to communicate with IP addresses included by the IP exception list even when the IP addresses are unassociated with a known domain name; and
a DNS exception list comprising one or more traffic requests that are associated with the current status that is allowed by the user;
wherein the one or more traffic requesters are included in a traffic requester group;
wherein the user selects the traffic requester group via the at least one display interface;
wherein the selection of a traffic requester of the one or more traffic requesters displayed on the at least one display interface using the user input device temporarily unblocks the selected traffic requester when the current status of the selected traffic requester is temporarily allowed in response to the making of the selection of temporary unblocking; and
wherein the selection of a traffic requester of the one or more traffic requesters displayed on the at least one display interface using the user input device temporarily blocks the selected traffic requester when the current status of the selected traffic requester is temporarily blocked in response to the making of the selection of temporary blocking.

11. The firewall security platform of claim 10, further comprising:
a domain name reply integrity process to determine an integrity of the communication data packets by correlating a DNS reply received within a window with a corresponding DNS request and setting the current status of the one or more traffic requesters associated with the communication data packets with DNS replies that cannot be correlated with the corresponding DNS request to blocked.

12. The firewall security platform of claim 10, wherein the current status is defined as allowed or blocked, wherein the current status that is allowed permits communication of the communication data packets associated with the at least one of the one or more traffic requesters being allowed, and wherein the current status that is blocked denies communication of the communication data packets associated with the at least one of the one or more traffic requesters being blocked.

13. The firewall security platform for enhancing computer and network security of claim 10, further comprising:
a domain name reply integrity process to determine an integrity of the communication data packets by correlating at least one DNS reply received from the at least one network interface card with a corresponding DNS request and setting to blocked the current status of the one or more traffic requesters when multiple DNS replies are received in response to the corresponding DNS request.

14. A firewall device for enhancing computer and network security, the firewall device comprising:
at least one network interface card for receiving and transmitting data packets;
a display interface;
a user input device;
a processor and associated memory for recording and retrieval of data;
for at least one DNS request, when only one DNS reply is received in response to the at least one DNS request during a window of time, a process for recording at least one received domain name and an associated IP address of the at least one received domain name in the memory in a real-time accessible data structure;
for the one DNS reply, a process for setting a default status in association with the at least one received domain name and for recording a representation of the at least received domain name and its associated default status in the memory in a real-time accessible data structure;
for at least one non-DNS packet, a process for determining a domain name associated with an IP address of a remote host;
wherein the process for determining the domain name retrieves (i) at least one domain name associated with the IP address from the data recorded in the memory, and (ii) a current status associated with the at least one domain name from the data recorded in the memory, and
wherein the representation of the domain name and a representation of the current status of the domain name are displayed on the display interface in real-time at the time the at least one non-DNS packet attempts to enter or is received from the at least one network interface card; and
a process that uses the user input device to instruct a change in the current status for the at least one domain name displayed in the representation by toggling the current status in real-time;
wherein a status change for the domain name is recorded as the current status; and
wherein the at least one non-DNS packet is discarded when the current status is blocked.

* * * * *